United States Patent
Cho et al.

(10) Patent No.: US 8,630,252 B2
(45) Date of Patent: Jan. 14, 2014

(54) TERMINAL APPARATUS AND A METHOD FOR TRANSMITTING FEEDBACK INFORMATION IN A WIRELESS COMMUNICATION SYSTEM

(75) Inventors: Han Gyu Cho, Seoul (KR); Bin Chul Ihm, Anyang-si (KR); Jin Sam Kwak, Gunpo-si (KR)

(73) Assignee: LG Electronics Inc., Seoul (KR)

(*) Notice: Subject to any disclaimer, the term of this patent is extended or adjusted under 35 U.S.C. 154(b) by 378 days.

(21) Appl. No.: 12/995,667

(22) PCT Filed: Jul. 7, 2009

(86) PCT No.: PCT/KR2009/003713
§ 371 (c)(1),
(2), (4) Date: Dec. 1, 2010

(87) PCT Pub. No.: WO2010/005226
PCT Pub. Date: Jan. 14, 2010

(65) Prior Publication Data
US 2011/0141990 A1   Jun. 16, 2011

Related U.S. Application Data

(60) Provisional application No. 61/078,772, filed on Jul. 8, 2008.

(51) Int. Cl.
*H04W 72/08* (2009.01)
*H04W 16/02* (2009.01)
*H04J 1/00* (2006.01)

(52) U.S. Cl.
USPC ........... 370/330; 370/346; 370/480; 370/252; 455/447; 455/452.2

(58) Field of Classification Search
USPC ......... 370/328, 329, 330, 280, 281, 344–345; 455/450, 452.1, 452.2
See application file for complete search history.

(56) References Cited

U.S. PATENT DOCUMENTS

| | | | |
|---|---|---|---|
| 7,129,030 B2 * | 10/2006 | Goto | 430/353 |
| 8,219,030 B2 * | 7/2012 | Gorokhov et al. | 455/62 |
| 2007/0218904 A1 | 9/2007 | Park et al. | |
| 2007/0293230 A1 * | 12/2007 | Lee | 455/450 |
| 2008/0062920 A1 | 3/2008 | Pi et al. | |
| 2008/0214198 A1 * | 9/2008 | Chen et al. | 455/450 |
| 2008/0232320 A1 * | 9/2008 | Lee et al. | 370/329 |
| 2009/0003266 A1 * | 1/2009 | Stolyar et al. | 370/328 |
| 2009/0247148 A1 * | 10/2009 | Chen et al. | 455/422.1 |
| 2009/0253447 A1 * | 10/2009 | Pi et al. | 455/501 |
| 2009/0316806 A1 * | 12/2009 | Cheng et al. | 375/260 |
| 2010/0034157 A1 * | 2/2010 | Stolyar et al. | 370/329 |
| 2010/0105406 A1 * | 4/2010 | Luo et al. | 455/452.2 |
| 2010/0272047 A1 * | 10/2010 | Zhu et al. | 370/329 |

* cited by examiner

Primary Examiner — Kwang B Yao
Assistant Examiner — Candal Elpenord
(74) Attorney, Agent, or Firm — Lee, Hong, Degerman, Kang & Waimey (57) ABSTRACT

A mobile station apparatus for transmitting feedback information in a wireless communication system and method thereof are disclosed. According to the present invention, feedback information is transmitted by a mobile station in a wireless communication system. The present invention includes receiving an allocation of a specific frequency partition from a base station by a fractional frequency reuse (FFR), generating a prescribed type feedback information on the specific frequency partition by measuring a channel quality of the specific frequency partition, and transmitting the feedback information on the specific frequency partition to the base station. Preferably, the mobile station can transmit feedback information on a frequency partition unallocated by the base station based on the received feedback request information. Accordingly, feedback overhead can be decreased in feedback transmission.

18 Claims, 4 Drawing Sheets

TERMINAL APPARATUS AND A METHOD FOR TRANSMITTING FEEDBACK INFORMATION IN A WIRELESS COMMUNICATION SYSTEM

CROSS-REFERENCE TO RELATED APPLICATIONS

This application is a National Stage Filing under 35 U.S.C. §371 of International Application No. PCT/KR2009/003713, filed on Jul. 7, 2009, which claims the benefit of priority to U.S. Provisional Application Ser. No. 61/078,772, filed on Jul. 8, 2008, the contents of all of which are incorporated by reference herein in their entirety.

BACKGROUND OF THE INVENTION

1. Field of the Invention

The present invention relates to a mobile station, and more particularly, to a mobile station apparatus for transmitting feedback information and method thereof.

2. Discussion of the Related Art

Generally, resource allocation is performed by a subchannel unit consisting of subcarriers in an orthogonal frequency division multiple access (hereinafter abbreviated OFDMA) system of a multicarrier type. In particular, multiple users share all subcarriers with each other by dividing the subcarriers. Through this, it is able to obtain a multi-user diversity gain on a frequency domain. In such an OFDMA based broadband mobile internet access system as WiBro (wireless broadband internet), every cell reuses the same frequency. And, it is able to maximize the throughput by applying adaptive modulation and coding (hereinafter abbreviated AMC) according to a corresponding received signal strength and inter-cell interference between adjacent cells.

In case of a system having a frequency reuse factor set to 1, the throughput is inevitably lowered due to the considerable interference between adjacent cells on a cell or sector boundary and a service outage situation is confronted. There is a method of enhancing performance on a cell boundary in using a frequency reuse factor set to 1. In particular, whole subcarrier is orthogonally divided into a plurality of frequency partitions. A plurality of the frequency partitions are appropriately arranged to enable each cell not to use some of the frequency partitions. Hence, the same channel interference between adjacent cells can be alleviated by not using some of the frequency partitions or performing transmission with low power. This scheme is called a fractional frequency reuse (hereinafter abbreviated FFR).

In order to apply the FFR to a real system, each mobile station estimates its precise location and then determines to use which band with reference to a frequency pattern provided to each cell. Yet, since a signal to interference ratio keeps changing continuously on the same band due to fading and mobile station's mobility in a real situation, the signal to interference ration should be dynamically considered to determine to use which frequency partition in the band allocated to each cell.

Thus, when the fractional frequency partition is allocated by cell unit, in order to use a resource dynamically according to the signal to interference ratio, inter-user fairness needs to be taken into consideration together with a given frequency reuse factor (hereinafter abbreviated FRF).

As mentioned in the foregoing description, when a plurality of frequency partitions are configured by orthogonally dividing while subcarrier in OFDMA system, it is able to consider diverse frequency reuse schemes to enable the frequency partition to be shared between cells. Concepts and properties of the frequency reuse schemes are described as follows.

First of all, if a frequency reuse factor gets closer to 1, a band available within a cell increases to raise band efficiency. Yet, inter-cell interference is increased by the same channel on a cell boundary or the like to raise an outage rate. On the contrary, the higher the frequency reuse factor increases, the less the interference due to the same channel between cells becomes. Yet, since an available band is reduced, band efficiency is lowered.

Regarding FFR, since an inter-cell interference level may not be relatively high for users located close to a base station in view point of whole cell, a service is provided using a frequency reuse factor set to 1 in a direction for maximizing whole cell capacity (i.e., using the whole subcarrier entirely). In case of using the frequency reuse factor set to 1, a service of good quality is provided to users on a cell boundary, in which the inter-cell interference is expected high, by reducing the inter-cell interference using a frequency reuse factor set to 3 (i.e., using a portion of segmentation 3 of each sector instead of using the whole subcarrier entirely).

SUMMARY OF THE INVENTION

An object of the present invention is to provide a mobile station apparatus for transmitting feedback information in a wireless communication system.

Another object of the present invention is to provide a method of transmitting feedback information in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting feedback information at a mobile station (MS) in a wireless communication system includes receiving an allocation of a specific frequency partition from a base station (BS) by a fractional frequency reuse (FFR) scheme, generating a prescribed type feedback information on the specific frequency partition by measuring a channel quality of the specific frequency partition, and transmitting the feedback information on the specific frequency partition to the base station.

Preferably, the method further includes transmitting the feedback information on a frequency partition unallocated to the mobile station by the base station. In this case, the feedback information on the frequency partition unallocated to the mobile station by the base station differs from the prescribed type feedback information on the specific frequency partition allocated to the mobile station by the base station in at least one of a feedback information type, a transmission period and a transmission channel used for feedback information transmission.

Preferably, the method further includes receiving feedback request information from the base station.

More preferably, the feedback request information includes information on at least one of a number and type of frequency partition(s) available for the mobile station to perform one feedback information transmission.

In this case, the feedback request information is transmitted on a control channel or a user-specific data channel.

The control channel has a type of A-MAP IE (advanced-MAP information element). And, the user-specific data channel has a type of a MAC (media access control) message.

More preferably, a period for requesting a feedback via the A-MAP IE type is different from that via the message type.

More preferably, the feedback request information includes information for requesting for the mobile station to transmit the feedback information per frequency partition.

More preferably, a periodicity for requesting a feedback via the control channel differs from that via the user-specific data channel.

Preferably, the feedback information includes at least one selected from the group consisting of a channel quality indicator (CQI) and noise and interference (NI) level information.

More preferably, the feedback information is transmitted in a manner that a feedback information type is different per the frequency partition.

More preferably, values of the CQI and the NI level are transmitted as one selected from the group consisting of an absolute value, a value relative to a value of the specific frequency partition, a value relative to an average value of all frequency partitions, and a value relative to a previous value.

More preferably, values of the CQI and the NI level are transmitted as one reference value for all frequency partitions and a relative value per frequency partition.

Preferably, the mobile station transmits the feedback information per frequency partition based on the feedback request information.

Preferably, the feedback information is transmitted via a feedback channel or a message type.

More preferably, a feedback transmission periodicity varies according to whether the feedback information is transmitted via the feedback channel or the message type.

First of all, the present invention reduces feedback overhead, thereby enabling efficient feedback transmission.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection.

The following descriptions are applicable to various communication systems, which are capable of providing various communication services of audio data, packet data, and the like. The technology of the communication system is usable in downlink or uplink. In this case, 'base station' can be replaced by such a terminology as a fixed station, a Node B, an eNode B (eNB), an access point, an advanced base station (ABS) and the like. And, 'mobile station (MS)' can be replaced by such a terminology as a user equipment (UE), a subscriber station (SS), a mobile subscriber station (MSS), an advanced mobile station (AMS), a mobile terminal and the like.

A transmitting end means a node for transmitting data or audio service, and a receiving end means a node for receiving the data or audio service. Therefore, a mobile station becomes a transmitting end and a base station becomes a transmitting end, in uplink. Likewise, a mobile station becomes a receiving end and a base station becomes a receiving end, in downlink.

Meanwhile, a mobile station of the present invention can include a PDA (personal digital assistant), a cellular phone, a PCS (personal communication service) phone, a GSM (global system for mobile) phone, a WCDMA (wideband CMDA) phone, an MBS (mobile broadband system) phone or the like.

Embodiments of the present invention are supportable by standard documents disclosed in at least one of wireless access systems including IEEE 802 system, 3GPP system, 3GPP LTE ($3^{rd}$ generation partnership projection long term evolution) system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, P802.16Rev2 and P802.16m documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention. In the following description, specific terminologies used for embodiments of the present invention are provided to help the understanding of the present invention. And, the use of the specific terminology can be modified into another form within the scope of the technical idea of the present invention.

Moreover, the term 'module' in this disclosure means one unit for processing a specific function or operation and can be implemented with hardware, software or a combination of hardware and software.

Figure 1:
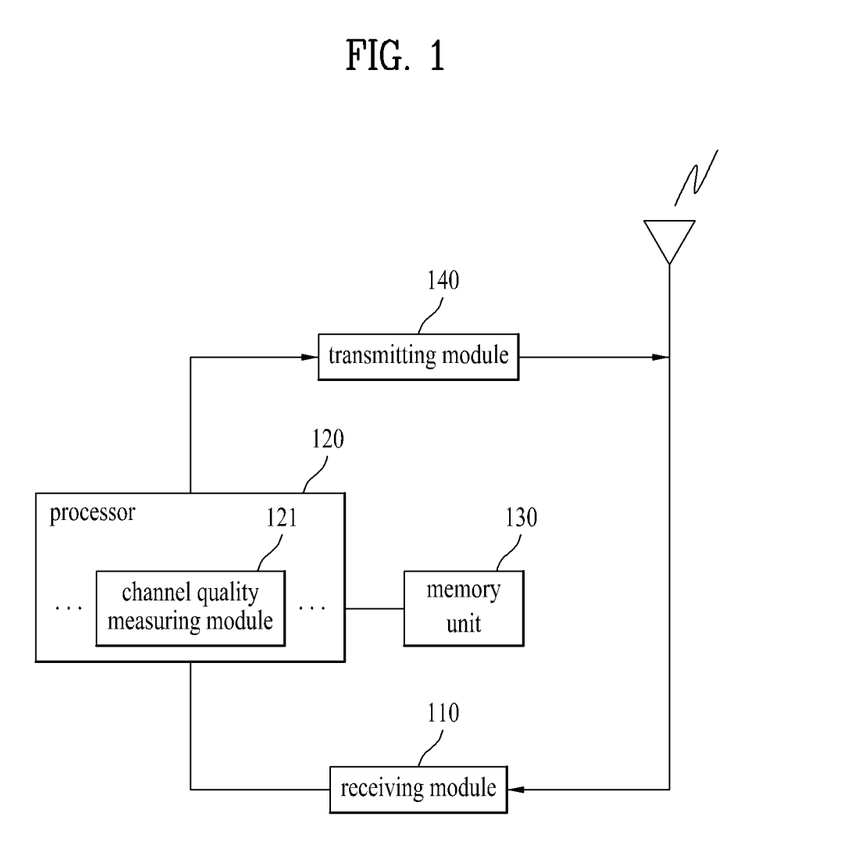
FIG. 1 is a block diagram of a mobile station apparatus for transmitting feedback information according to one preferred embodiment of the present invention.

FIG. 1 is a block diagram of a mobile station apparatus for transmitting feedback information according to one preferred embodiment of the present invention.

Referring to FIG. 1, a mobile station apparatus for feedback information transmission according to the present invention includes a receiving module 110, a processor 120, a memory unit 130 and a transmitting module 140.

The receiving module 110 is capable of receiving all downlink signals coming from a base station. And, the receiving module 110 can receive a signal for requesting feedback information transmission from the base station.

The processor 120 can include protocols and functions required for performing various processes described in this disclosure on IEEE 802.16m, LTE (Long term evolution), LTE-A (Long term evolution-Advanced) and the like. And, the processor 120 may include a channel quality measuring module 121.

The channel quality measuring module 121 measures a channel quality state using a downlink signal received via the receiving module 110 from the base station and then can generate feedback information. In this case, the channel quality measuring module 121 can measure a channel quality periodically. Moreover, the channel quality measuring module 121 measures a channel quality according to a feedback information transmission request received via the receiving module 110 from the base station and then can generate feedback information. In this case, a corresponding channel quality measurement period may be non-periodic.

The memory unit 130 can store a channel quality value measured by the channel quality measuring unit 121 and the like for prescribed duration. And, the memory unit 130 can be replaced by such a component as a buffer (not shown in the drawing) and the like.

The transmitting module 140 can transmit the feedback information generated according to the channel quality value measured by the channel quality measuring module 121 to the base station.

In the following description, a method of transmitting the feedback information, which is performed by the processor 120 of the mobile station apparatus according to the present invention, is explained. First of all, resource unit mapping in IEEE 802.16m system using FFR fractional frequency reuse (FFR) is explained.

Figure 2:
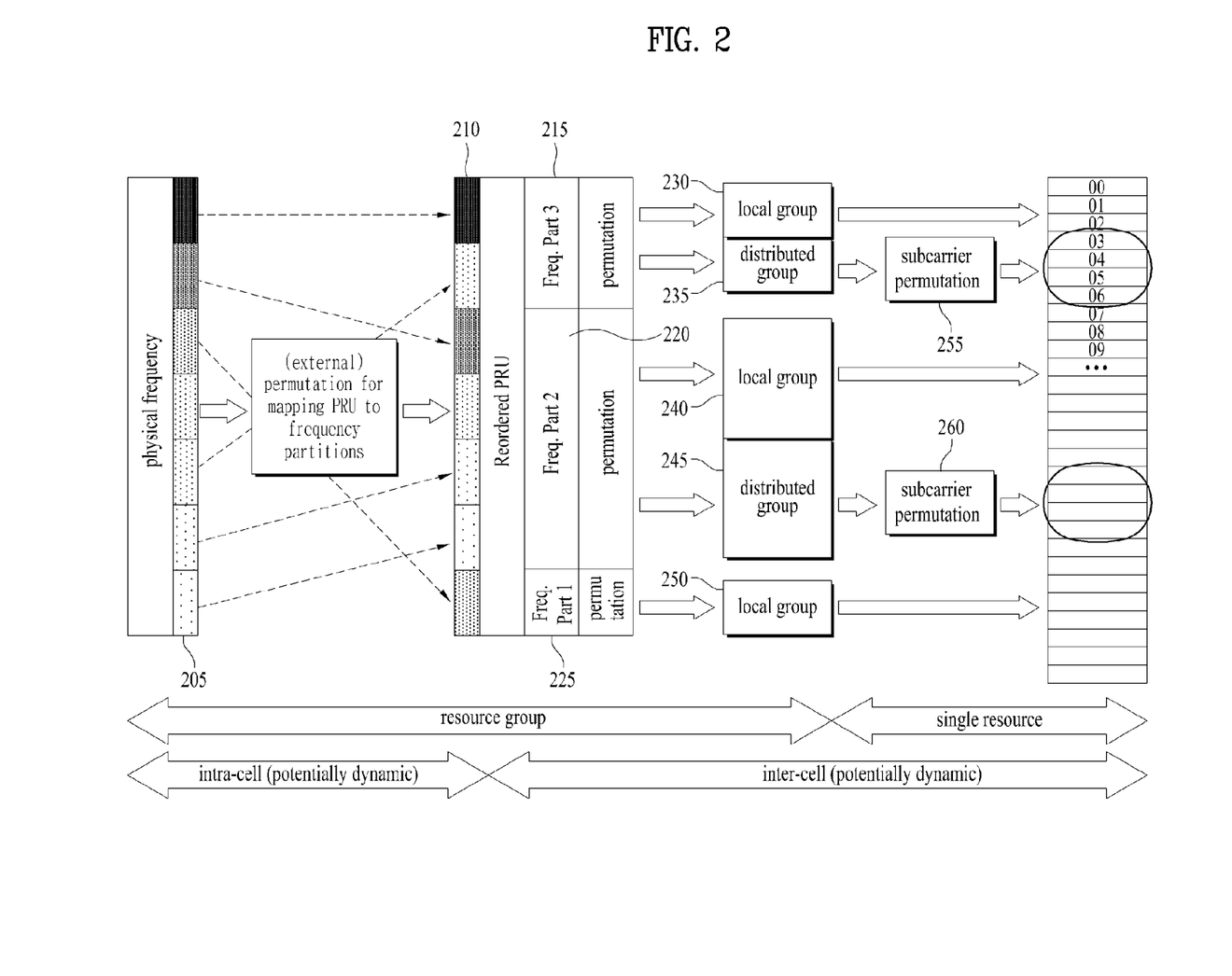
FIG. 2 is a diagram of an example for resource unit mapping of downlink subcarrier in IEEE 802.16m system.

FIG. 2 is a diagram of an example for resource unit mapping of downlink subcarrier in IEEE 802.16m system.

Referring to FIG. 2, a block 205 indicates contiguous physical resource units (PRUs) of one set within a physical region. First of all, the contiguous resource units of one set are permutated to configure a set of physical resource units 210, of which sequence is re-ordered. Secondly, the sequence re-ordered set of the physical resource units 210 can be allocated to several frequency partitions.

For instance, the several frequency partitions, as shown in FIG. 2, can include a first frequency partition (Freq. Part1) 225, a second frequency partition (Freq. Part2) 220 and a third frequency partition (Freq. Part3) 215. In this case, each of the frequency partitions 215, 220 and 225 can be reserved for an FFR group for each sector within one cell.

In each of the frequency partitions 215, 220 and 225, one portion of the sequence re-ordered physical resource units 210 is allocated to local permutation groups 230, 240 and 250. And, the rest of the sequence re-ordered physical resource units 210 can be allocated to distributed permutation groups 235 and 245.

In this case, the resource units of the local permutation groups 230, 240 and 250 are reserved for contiguous resource mapping. And, the resource units of the distributed permutation groups 235 and 245 can be reserved for distributed resource mapping. Subsequently, the resource units can be distributed by subcarrier permutation in 255 and 260.

The resource mapping from subcarriers includes a PRU permutation (or a first permutation). And, the physical resource unit 210s can be generated in a manner that the sequence of the resource units 205 is re-ordered through the PRU permutation for mapping physical resource units to frequency partitions.

Moreover, the resource mapping from the subcarriers can include a permutation performed within each frequency partition (i.e., a second permutation) and a permutation performed by a unit of a predetermined number of subcarriers (i.e., a third permutation). In this case, the physical resource units can be distributed to the frequency partitions by the PRU permutation that is the first permutation.

New numbers can be given to indexes of the physical resource units, of which sequence is re-ordered by the second permutation, within each of the frequency partitions 215, 220 and 225. By giving the numbers newly, the physical resource units 210 can be distributed to a resource group for local allocation or distributed allocation.

Subsequently, the subcarriers can be distributed to subchannel (i.e., one DLRU) by the third permutation. A series of this process can be performed once by a single processing procedure.

In the IEEE 802.16m system, resource mapping is performed not by a subcarrier unit but by a physical resource unit. A distributed resource unit (DRU) and a contiguous resource unit (CRU) can coexist within a single subframe. In this case, a single frequency partition can include 4 PRUs.

When a resource is allocated to users on a frequency axis in a wireless communication system (e.g., IEEE 802.16m), frequency partitioning (or grouping) can be taken into consideration for the purpose of fractional frequency reuse (hereinafter abbreviated FFR) or the like. In performing the frequency partitioning, a base station can determine to allocate a specific frequency partition (or a group) to each mobile station. For this, channel state measurement of a mobile station and feedback are required.

Moreover, a channel quality indicator (CQI) feedback for frequency selective scheduling gain or modulation & coding schemes (MCS) can be transmitted by differentiating a transmission periodicity, a transmitting scheme and the like in a manner of discriminating an allocated frequency partition and an unallocated frequency partition from each other.

Figure 3:
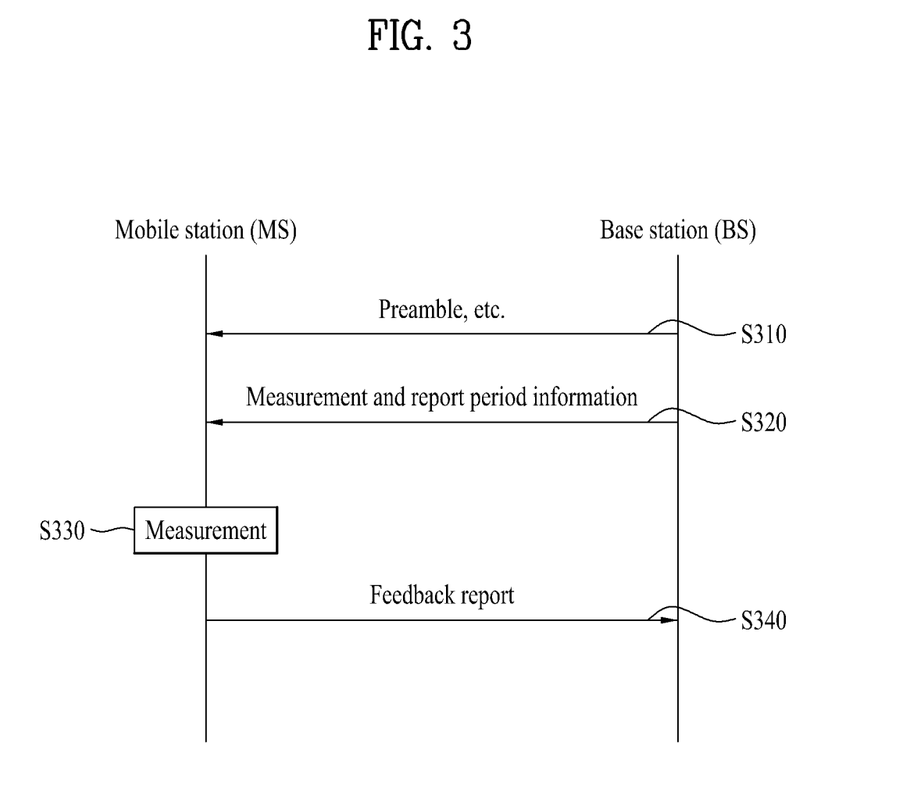
FIG. 3 is a diagram of one example for a mobile station to transmit feedback information in FFR.

FIG. 3 is a diagram of one example for a mobile station to transmit feedback information in FFR.

Referring to FIG. 3, a base station needs pathloss or geometry information for FFR partition (or group) selection. In this case, the geometry information may include the information on a distance between a mobile station and a base station. First of all, a mobile station can receive a downlink signal from a base station [S310]. The downlink signal received by the mobile station from the base station can include one of a preamble, a midamble, a common pilot and the like.

Moreover, the mobile station can receive information on a measurement period for measuring the pathloss or the geometry information and information on a period for reporting the measurements to the base station from the base station [S320]. The base station may unicast or broadcast the measurement of the pathloss or the geometry information and the report period information to the mobile station in a manner of mobile station-specific or FFR group-specific.

The mobile station can measure the pathloss or the geometry information using the downlink signal from the base station [S330]. In this case, the mobile station can measure the pathloss or the geometry information using the downlink signal irrespective of downlink/uplink, time division duplex/frequency division duplex (TDD/FDD).

Since the measured information is the information based on long-term geometry, each mobile station may have a single value as measured information. And, the measured value can be acquired from sector-specific measurement in consideration of sectorization.

Generally, report period of the measured value for pathloss or the geometry information by mobile station may be not greater than a dynamic period (dynamics) of the FFR. In this case, the FFR dynamic period (dynamics) can indicate configuration of inter-cell FFR, the number of FFR groups, or a period for changing a bandwidth per FFR group and power level in common.

Moreover, the mobile station can report the measurement value to the base station by a period not smaller than the measurement period. Sizes of the measurement period of the mobile station, the report period of the mobile station and the dynamic period of the FFR can be represented as follows.

Measurement period of mobile station≤report period of mobile station≤FFR dynamic period The report period of the mobile station may be set equal to or greater than a scheduling period of a cell. The report period of the mobile station may become the scheduling period of the cell. Alternatively, since the report period of the mobile station is greater than the scheduling period, user scheduling can be performed per FFR group by a unit of the report period. And, scheduling can be performed only within each group by the scheduling unit.

Thus, the mobile station may report feedback information to the base station according to the report period of the feedback information received from the base station [S340]. In this case, the mobile station may report the measured information to the base station in a manner of using the scanning report in the conventional wireless communication system (e.g., IEEE 802.16e system) as it is. In particular, the conventional scanning report is the report provided to the base station by the mobile station located on a cell boundary in case of performing handover. It is able to reuse the report in the conventional IEEE 802.16e system. Moreover, it is able to add a function for making a report with a period optimized for the FFR group selection by modifying and/or changing the previous scanning report. Besides, it is able to make a report using a new reporting IE (information element) for the FFR group selection.

In the following description, a method of feeding back a CQI in a short term in the FFR scheme is explained.

First of all, a short-term CQI feedback for frequency selective scheduling or modulation and coding schemes (MCS) selection can be designed in consideration of FFR grouping. In general, a base station can set an allocated frequency partition (or an allocated group) or an unallocated partition (or an allocated group) to differ from each other in a period of CQI scheme, a CQI feedback method, accuracy and the like. And, the periodicity of CQI feedback, the CQI feedback scheme, the accuracy and the like can vary according to a permutation mode (e.g., a localized permutation mode, a distributed permutation mode, etc.).

Explained in the following description is a case that a permutation mode is a localized permutation mode. First of all, M best band feedbacks can be performed on an allocated frequency partition (or group) only. And, sounding can be performed on the allocated frequency partition (or group) only. Alternatively, the same feedback or sounding signal can be transmitted for the unallocated partition (or group) by the same periodicity of the allocated partition (or group) or a longer periodicity. Moreover, it is able to transmit a more schematic feedback value (e.g., an averaged CQI value) or sounding signal.

Explained in the following description is a case that a permutation mode is a distributed permutation mode. First of all, a mobile station feeds back an averaged CQI value for an allocated partition (or group) only or is able to transmit a sounding signal for the allocated partition (or group) only. The mobile station feeds back a CQI value or transmits a sounding signal, for an unallocated partition (or group), using the same periodicity and scheme of the allocated partition. And, the mobile station can use a more schematic feedback or sounding.

The feedback for the allocated partition (or group) and the feedback for the unallocated partition (or group) may differ from each other in periodicity. And, each of the feedbacks can be performed by a different scheme. For instance, each of the feedbacks can be performed using a different CQI feedback structure.

A feedback scheme in case of presence of a plurality of frequency partitions is explained as follows. In particular, assume a distributed permutation mode.

Figure 4:
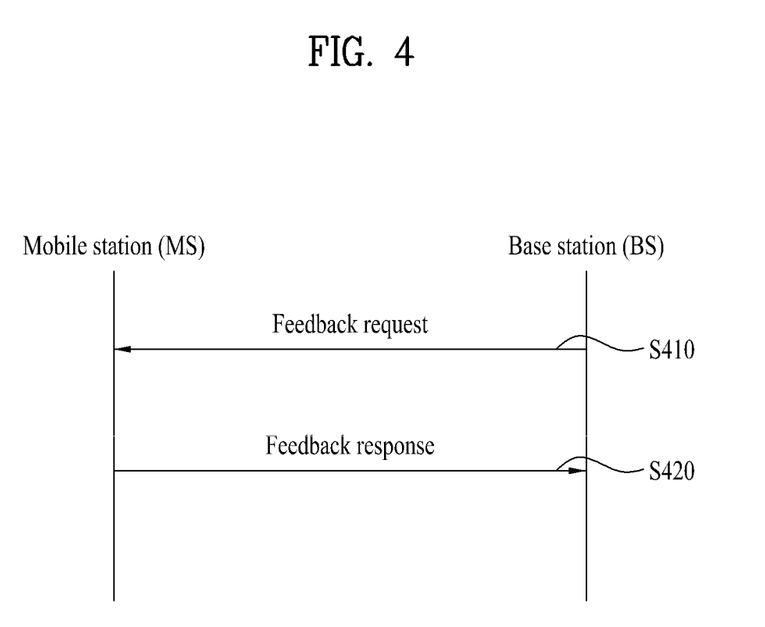
FIG. 4 is a diagram of a feedback scheme for a plurality of frequency partitions.

FIG. 4 is a diagram of a feedback scheme for a plurality of frequency partitions.

Referring to FIG. 4, a base station can make a request for a feedback transmission to a mobile station [S410]. In particular, the base station can make a request for a feedback transmission via a control channel or a data channel for a specific mobile station.

In this case, the control channel can include one of a broadcast channel, A-MAP IE (Advanced-MAP information element) and the like. For example, the base station can make a request for a feedback transmission via the A-MAP IE among the control channels. In the following description, a type for the base station to request the feedback transmission via the A-MAP IE shall be named A-MAP IE type. Meanwhile, the base station can transmit resource allocation information, power control information and the like to the mobile station using the A-MAP IE. For one example, the data channel for the specific mobile station can include a MAC (media access control) message. In the following description, a type of making the request for the feedback transmission via the data channel for the specific mobile station shall be named a message type. In general, the A-MAP IE is frequently transmitted in a manner of being coded stronger than the MAC message.

The information on the feedback request made by the base station can include information on the number and type of frequency partitions available for the one-time feedback information transmission performed by the mobile station.

In particular, the base station can set a feedback for a plurality of frequency partitions to be enabled once in case of the feedback transmission request. Alternatively, the base station can set a feedback to be enabled for one frequency partition for a time. Alternatively, the base station can set a feedback to be enabled with a predetermined periodicity (e.g., a predetermined pattern on a time axis) despite performing one feedback for a time.

The base station can make a request for the mobile station to perform a feedback transmission per frequency partition or feedback information via the A-MAP IE type or the message type. Having received the feedback request information from the base station, the mobile station can transmit the feedback information to the base station via a feedback channel or the message type [S420].

A case of transmitting the feedback information via the feedback channel may differ from a case of transmitting the feedback information via the message type in a feedback information transmission period. To correspond to the request from the base station for the feedback transmission per the frequency partition or feedback information, the mobile station may perform the feedback information transmission per the frequency partition or the feedback information.

The mobile station may simultaneously perform feedbacks for all frequency partitions. In doing so, in aspect of the base station, feedback information having a smallest time delay for all frequency partitions is possessed by the base station. Therefore, the base station can allocate an optimal frequency partition to the mobile station. Yet, if the mobile station transmits the feedback information on all frequency partitions, it is disadvantageous in that feedback transmission overhead increases.

The mobile station can transmit the feedback information for the frequency partition currently allocated to the mobile station only (e.g., reuse-1 frequency partition, power-boosted frequency partition among reuse-3 partitions, etc.). This is advantageous in that the feedback transmission overhead becomes smallest. Yet, it is difficult for the base station to perform scheduling.

Moreover, the mobile station can transmit the feedback information in a manner of discriminating the frequency partition currently allocated to the mobile station only (e.g., reuse-1 frequency partition, power-boosted frequency partition among reuse-3 partitions, etc.) from an unallocated frequency partition.

For example, in these two cases, the mobile station performs transmissions by differentiating one of periodicity, feedback information, feedback information transmitting scheme, feedback information transmission channel and a combination thereof.

In the following description, explained are items that can be taken into consideration in case that a mobile station transmits feedback information. When a mobile station transmits feedback information, the feedback information may include CQI, noise and interference (NI) level and the like. These values may include absolute values, values relative to a specific value of one frequency partition or an average of all frequency partitions, or relative values for previous values.

The mobile station can perform a transmission in a different feedback information type in a manner of transmitting both of CQI value and noise and interference (NI) level value per frequency partition or one of them. The mobile station can perform a transmission in a different way in a manner of transmitting absolute values of CQI and noise and interference level per frequency partition or transmitting relative values thereof. And, the mobile station transmits feedback information in a manner of transmitting one reference value for all frequency partitions and a relative value per frequency partition. Moreover, the mobile station can perform a feedback transmission for an unallocated frequency partition in a manner different from that of the allocated frequency partition. For instance, the mobile station may perform the feedback transmission in a manner of transmitting an averaged CQI value and an averaged noise and interference level (NI) value for an unallocated frequency partition. In this case, it is able to decrease a feedback transmission overhead for the unallocated frequency partition.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after filing of the present application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and the like.

In case of the implementation by firmware or software, a method according to each embodiment of the present invention can be implemented by modules, procedures, and/or functions for performing the above-explained functions or operations.

In aspect of industrial applicability, it is apparent that a method of transmitting feedback information in a wireless communication system according to the present invention is usable for industry.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting feedback information at a mobile station in a wireless communication system, the method comprising: receiving, at the mobile station, an allocation of a specific frequency partition from a base station by a fractional frequency reuse (FFR) scheme; generating, at the mobile station, first feedback information on the specific frequency partition allocated to the mobile station by measuring a channel quality of the specific frequency partition; generating, at the mobile station, second feedback information on a frequency partition unallocated to the mobile station by measuring a channel quality of the unallocated frequency partition; and transmitting, at the mobile station, the first and second feedback information to the base station, wherein a transmission period of the first and second feedback information is below or equal to an FFR dynamics period for indicating at least a configuration of inter-cell FFR and a number of FFR groups, or a period for changing a bandwidth per FFR group and power level in common.

2. The method of claim 1, wherein the second feedback information differs from the first feedback information by at least a feedback information type, the transmission period, or a transmission channel used for feedback transmission.

3. The method of claim 1, further comprising:
receiving a feedback request from the base station.

4. The method of claim 3, wherein the feedback request includes information on at least a number or type of one or more frequency partitions available for the mobile station to perform one feedback transmission.

5. The method of claim 3, wherein the feedback request is transmitted via a control channel or a user-specific data channel.

6. The method of claim 5, wherein the control channel corresponds to a type of Advanced-MAP Information Element (A-MAP IE).

7. The method of claim 5, wherein the user-specific data channel corresponds to a type of a MAC (media access control) message.

8. The method of claim 5, wherein a period of the feedback request transmitted via an A-MAP IE type is different from a period of the feedback request transmitted via a MAC message type.

9. The method of claim 1, wherein the first and second feedback information comprises the channel quality according to a corresponding frequency partition.

10. The method of claim 5, wherein a period of the feedback request transmitted via the control channel differs from a period of the feedback request transmitted via the user-specific data channel.

11. The method of claim 1, wherein the first and second feedback information comprises at least a channel quality indicator (CQI) or noise and interference (NI) level information.

12. The method of claim 11, wherein values of the CQI and the NI level comprise an absolute value, a value relative to a value of the specific frequency partition or all frequency partitions, or a value relative to a previous value.

13. The method of claim 11, wherein values of the CQI and the NI level are transmitted as a reference value for all frequency partitions or a relative value per frequency partition.

14. The method of claim 1, wherein the first and second feedback information is transmitted via a feedback channel or a message type.

15. The method of claim 14, wherein at least transmission periods of the first feedback information or the second feedback information vary according to whether the first feedback information or the second feedback information is transmitted via the feedback channel or the message type.

16. A mobile station, comprising a receiving module configured to receive an allocation of a specific frequency partition from a base station by a fractional frequency reuse (FFR) scheme; a memory unit configured to store the allocated specific frequency partition information and information on an unallocated frequency partition; a processor connected to the memory unit and configured to generate: first feedback information on the allocated specific frequency partition by measuring a channel quality of the specific frequency partition; and second feedback information on the unallocated frequency partition by measuring a channel quality of the unallocated frequency partition; and a transmitting module configured to transmit the first and second feedback information to the base station, wherein a transmission period of the first and second feedback information is below or equal to an FFR dynamics period for indicating at least a configuration of inter-cell FFR and a number of FFR groups, or a period for changing a bandwidth per FFR group and power level in common.

17. The mobile station of claim 16, wherein the second feedback information differs from the first feedback information by at least a feedback information type, the transmission period, or a transmission channel used for feedback transmission.

18. The mobile station of claim 16, wherein the generating the first and second feedback information by the processor is performed in response to a feedback request from the base station.

* * * * *